US010735081B2

(12) United States Patent
Wong

(10) Patent No.: US 10,735,081 B2
(45) Date of Patent: Aug. 4, 2020

(54) HETEROGENEOUS NETWORK, MOBILE DEVICE AND METHOD FOR BEAM TRAINING AND TRACKING

(71) Applicant: Chiun Mai Communication Systems, Inc., New Taipei (TW)

(72) Inventor: Kwo-Jyr Wong, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 145 days.

(21) Appl. No.: 16/129,824

(22) Filed: Sep. 13, 2018

(65) Prior Publication Data

US 2019/0081692 A1 Mar. 14, 2019

Related U.S. Application Data

(60) Provisional application No. 62/558,284, filed on Sep. 13, 2017.

(51) Int. Cl.
*H04B 7/08* (2006.01)
*H04W 72/04* (2009.01)
*H04B 7/06* (2006.01)
*H04W 16/28* (2009.01)

(52) U.S. Cl.
CPC .......... *H04B 7/088* (2013.01); *H04B 7/0617* (2013.01); *H04B 7/0695* (2013.01); *H04W 16/28* (2013.01); *H04W 72/048* (2013.01)

(58) Field of Classification Search
CPC ... H04W 16/28; H04B 7/0617; H04B 7/0695; H04B 7/088
See application file for complete search history.

(56) References Cited

U.S. PATENT DOCUMENTS

| | | | | |
|---|---|---|---|---|
| 6,782,264 B2* | 8/2004 | Anderson | ................. | G01S 5/02 455/456.1 |
| 2008/0181174 A1* | 7/2008 | Cho | ...................... | H04B 7/0857 370/329 |
| 2013/0084884 A1* | 4/2013 | Teyeb | ................... | H04W 48/04 455/456.1 |
| 2013/0143503 A1* | 6/2013 | Li | ........................ | H04W 24/02 455/63.1 |
| 2013/0156120 A1* | 6/2013 | Josiam | .................. | H04L 5/0023 375/260 |
| 2015/0133172 A1* | 5/2015 | Silverman | ............. | H04W 4/023 455/456.6 |
| 2015/0234033 A1* | 8/2015 | Jamieson | .................. | G01S 5/04 455/456.1 |

(Continued)

*Primary Examiner* — Jenee Holland
(74) *Attorney, Agent, or Firm* — ScienBiziP, P.C.

(57) ABSTRACT

A heterogeneous network includes a first base station, a number of second base stations and a mobile device. The mobile device communicates with the second base stations via mm-wave signals and send, via wireless signals, the first base station a position of the mobile device and a request for connecting with one of the second base stations. The first base station determines one of the second base stations to connect with the mobile device according to the position and the request sent by the mobile device. The first base station sends, via the wireless signals, the mobile device a first beam angle information and triggers the mobile device and the one determined second base station to perform a beam training process according to the first beam angle information.

29 Claims, 14 Drawing Sheets

(56) References Cited

U.S. PATENT DOCUMENTS

| | | | | |
|---|---|---|---|---|
| 2015/0263424 A1* | 9/2015 | Sanford | ........... | H01Q 3/46 |
| | | | | 342/371 |
| 2015/0341095 A1* | 11/2015 | Yu | ........... | H04B 7/0619 |
| | | | | 370/252 |
| 2016/0021549 A1* | 1/2016 | Subramanian | ........ | H04W 76/10 |
| | | | | 370/329 |
| 2016/0033614 A1* | 2/2016 | Wang | ........... | G01S 3/46 |
| | | | | 342/378 |
| 2016/0065284 A1* | 3/2016 | Yu | ........... | H04W 16/28 |
| | | | | 370/329 |
| 2016/0099763 A1* | 4/2016 | Chen | ........... | H04B 7/063 |
| | | | | 370/329 |
| 2016/0142922 A1* | 5/2016 | Chen | ........... | H04B 7/0695 |
| | | | | 375/267 |
| 2016/0191130 A1* | 6/2016 | Bengtsson | ........... | H04B 7/0615 |
| | | | | 375/267 |
| 2016/0366548 A1* | 12/2016 | Wang | ........... | G01S 13/825 |
| 2017/0317729 A1* | 11/2017 | Kobayashi | ........... | H04B 7/10 |
| 2018/0006702 A1* | 1/2018 | Doostnejad | ........... | H04B 7/0639 |
| 2018/0091947 A1* | 3/2018 | Shirakata | ........... | G01S 5/0036 |
| 2018/0131434 A1* | 5/2018 | Islam | ........... | H01Q 1/246 |
| 2018/0192428 A1* | 7/2018 | Doostnejad | ........... | H04B 7/0452 |
| 2018/0269934 A1* | 9/2018 | Kim | ........... | H04W 72/0413 |
| 2018/0287687 A1* | 10/2018 | Wu | ........... | G01S 3/043 |
| 2018/0317197 A1* | 11/2018 | Kasher | ........... | H04W 16/28 |
| 2019/0044756 A1* | 2/2019 | Zhao | ........... | H04B 7/0482 |
| 2019/0319686 A1* | 10/2019 | Chen, IV | ........... | H04W 72/046 |
| 2019/0334599 A1* | 10/2019 | Davydov | ........... | H04L 5/0051 |

* cited by examiner

HETEROGENEOUS NETWORK, MOBILE DEVICE AND METHOD FOR BEAM TRAINING AND TRACKING

CROSS-REFERENCE TO RELATED APPLICATIONS

This application claims priority to U.S. provisional Patent Application No. 62/558,284 filed on Sep. 13, 2017, the contents of which are incorporated by reference herein.

FIELD

The subject matter herein generally relates to communication field, especially relates to a heterogeneous network, a mobile device and a method for beam training and tracking.

BACKGROUND

Beam forming (BF) determines the best beam direction formed by multiple antenna elements and maximizes the transmission rate according to the best beam direction. However, millimeter wave (mm-wave) BF schemes based on estimating the entire channel state information suffer from high calculation load and large overhead. Therefore, building and keeping a robust RF link between a base station and a mobile device in a heterogeneous network is required.

BRIEF DESCRIPTION OF THE DRAWINGS

Implementations of the present disclosure will now be described, by way of example only, with reference to the attached figures.

DETAILED DESCRIPTION

Figure 1:
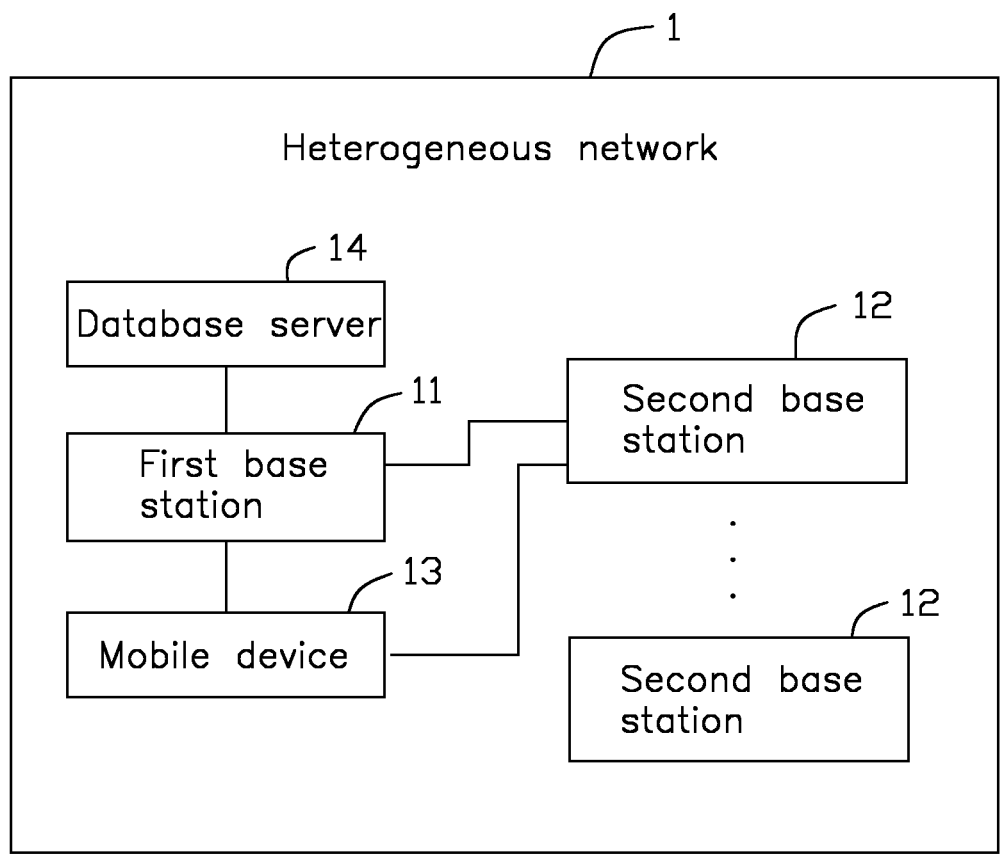
FIG. 1 is a block diagram of a heterogeneous network.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates an embodiment of a heterogeneous network 1. The heterogeneous network 1 includes, but not limited to a first base station 11, a number of second base stations 12, at least one mobile device 13 and a database server 14. In at least one embodiment, the first base station 11 communicates with the number of second base stations 12 by a backhaul or a C-RAN (Cloud Radio Access Network). In at least one embodiment, the first base station 11 can be a macro LTE base station, each of the second base stations 12 is an millimeter wave (mm-wave) station, and the mobile device 13 can be a mobile phone. The first base station 11 communicates with the mobile device 13 by wireless signals, for example, through the LTE protocol defined by 3rd Generation Partnership Project (3GPP). The mobile device 13 can communicate with each of the number of the second base stations 12 by millimeter wave (mm-wave) signals. In at least one embodiment, the database server 14 connects to the first base station 11 and stores a first beam angle information.

In at least one embodiment, the mobile device 13 sends a request for connecting with one second base station 12 and a position of the mobile device 13 to the first base station 11. The first base station 11 determines one of the second base stations 12 to connect with the mobile device 13 and obtains a first beam angle information according to the request and the position of the mobile device 13. The first base station 11 further obtains the first beam angle information from the database server 14 and send the obtained first beam angle information to the mobile device 14. The first base station 11 further triggers a beam training process between the mobile device 13 and the determined second base station 12 according to the first beam angle information.

Figure 2:
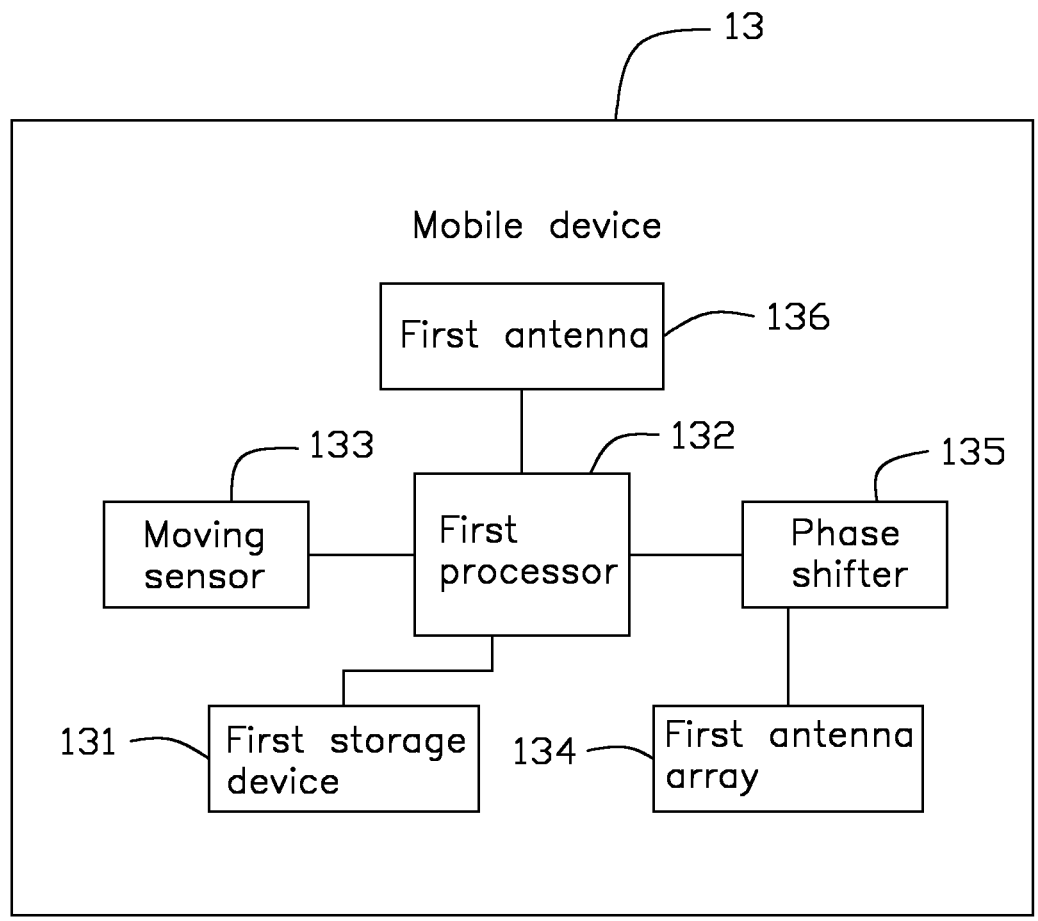
FIG. 2 is a block diagram of an embodiment of a mobile device of FIG. 1.

FIG. 2 illustrates an embodiment of the mobile device 13. The mobile device 13 includes, but is not limited to, a first storage device 131, a first processor 132, at least one moving sensor 133, at least one first antenna array 134, at least one first phase shifter 135 and a first antenna 136. The first antenna array 134 is configured to transmit and receive mm-wave signals. The first antenna 136 is configured to transmit and receive wireless signals. The at least one first phase shifter 135 is electrically coupled between the first processor 132 and the at least one first antenna array 134. The moving sensor 133 can acquire the movement information of the mobile device 13. In at least one embodiment, the moving sensor 133 can be a magnetometer, a gyro sensor, an accelerometer or a GPS unit. The first storage device 131 is configured to store the data and program instructions installed in the mobile device 13. For example, the first storage device 131 can be an internal storage system, such as a flash memory, a random access memory (RAM) for temporary storage of information, and/or a read-only memory (ROM) for permanent storage of information. In another embodiment, the first storage device 131 can also be an external storage system, such as a hard disk, a storage card, or a data storage medium. The first processor 132 is configured to execute program instructions installed in the mobile device 13 and control the mobile device 13 to execute corresponding actions. In at least one embodiment, the first processor 132 can be a central processing unit (CPU), a microprocessor, a digital signal processor, an application processor, a modem processor or an integrated processor with an application processor and a modem processor integrated inside.

Figure 3:
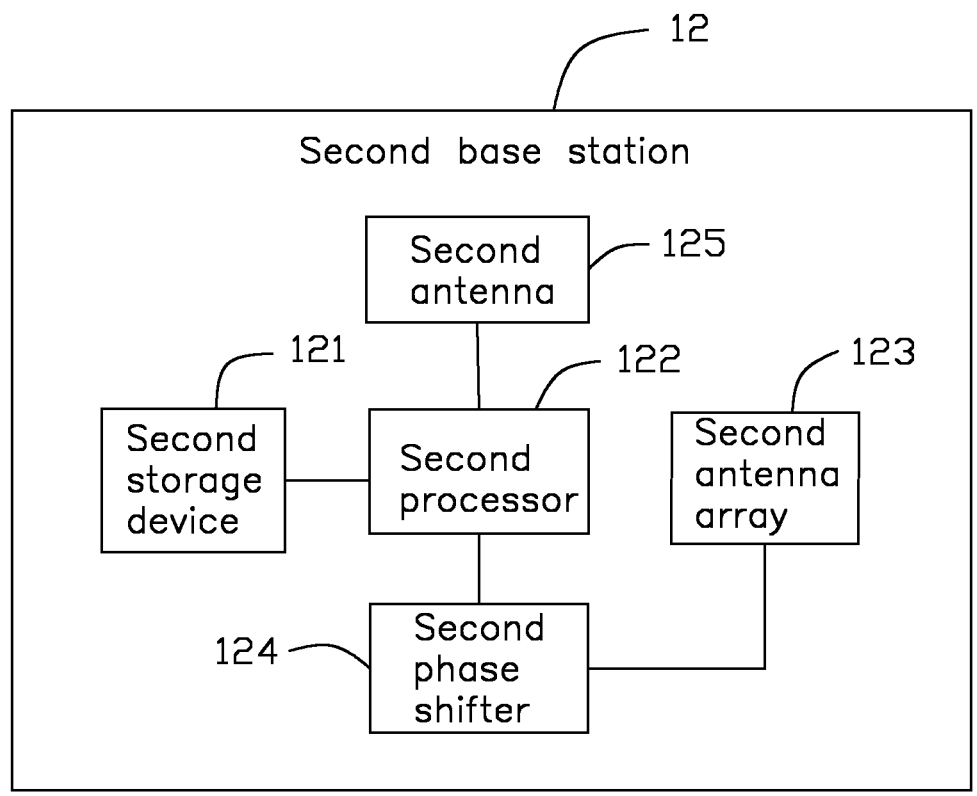
FIG. 3 is a block diagram of one embodiment of a second base station of FIG. 1.

FIG. 3 illustrates an embodiment of the second base station 12. The second base station 12 includes, but is not limited to, a second storage device 121, a second processor 122, at least one second antenna array 123, at least one second phase shifter 124, and a second antenna 125. The second antenna array 123 is configured to transmit and receive mm-wave signals while the second antenna 125 is configured to transmit and receive wireless signals. The at least one second phase shifter 124 is electrically coupled between the second processor 122 and the at least one second antenna array 123. The second storage device 121 stores the data and program instructions installed in the second base station 12. In at least one exemplary embodiment, the second storage device 121 can be an internal storage system of the second base station 12, such as a flash memory, a random access memory (RAM) for temporary storage of information, and/or a read-only memory (ROM) for permanent storage of information. In another embodiment, the second storage device 121 can also be an external storage system, such as a hard disk, a storage card, or a data storage medium. The second processor 122 executes program instructions installed in the second base station 12 and controls the second base station 12 to execute corresponding actions. In at least one exemplary embodiment, the second processor 122 can be a central processing unit (CPU), a microprocessor, a digital signal processor, an application processor, a modem processor or an integrated processor with an application processor and a modem processor integrated inside.

Figure 4:
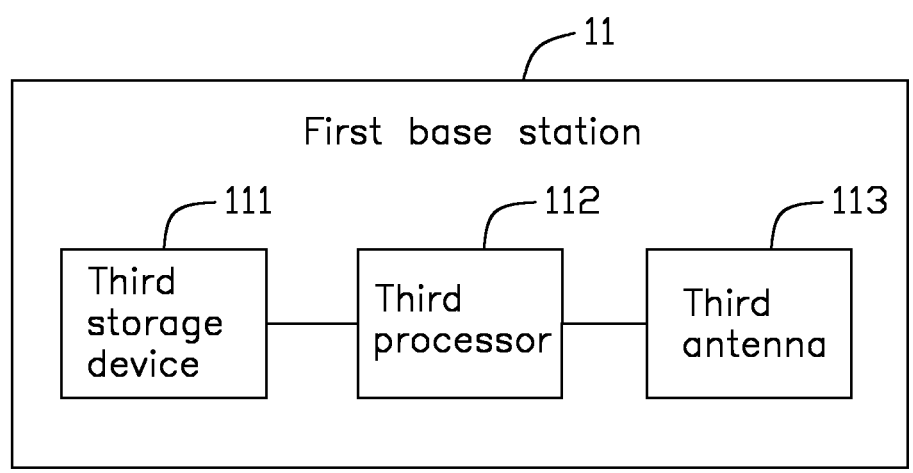
FIG. 4 is a block diagram of one embodiment of a first base station FIG. 1.

FIG. 4 illustrates an embodiment of the first base station 11. The first base station 11 includes, but is not limited to, a third storage device 111, a third processor 112 and a third antenna 113. The third storage device 111 stores the data and program instructions. The third processor 112 executes program instructions installed in the first base station 11 and control the first base station 11 to execute corresponding actions. The third antenna 113 is configured to transmit and receive wireless signals.

Figure 5:
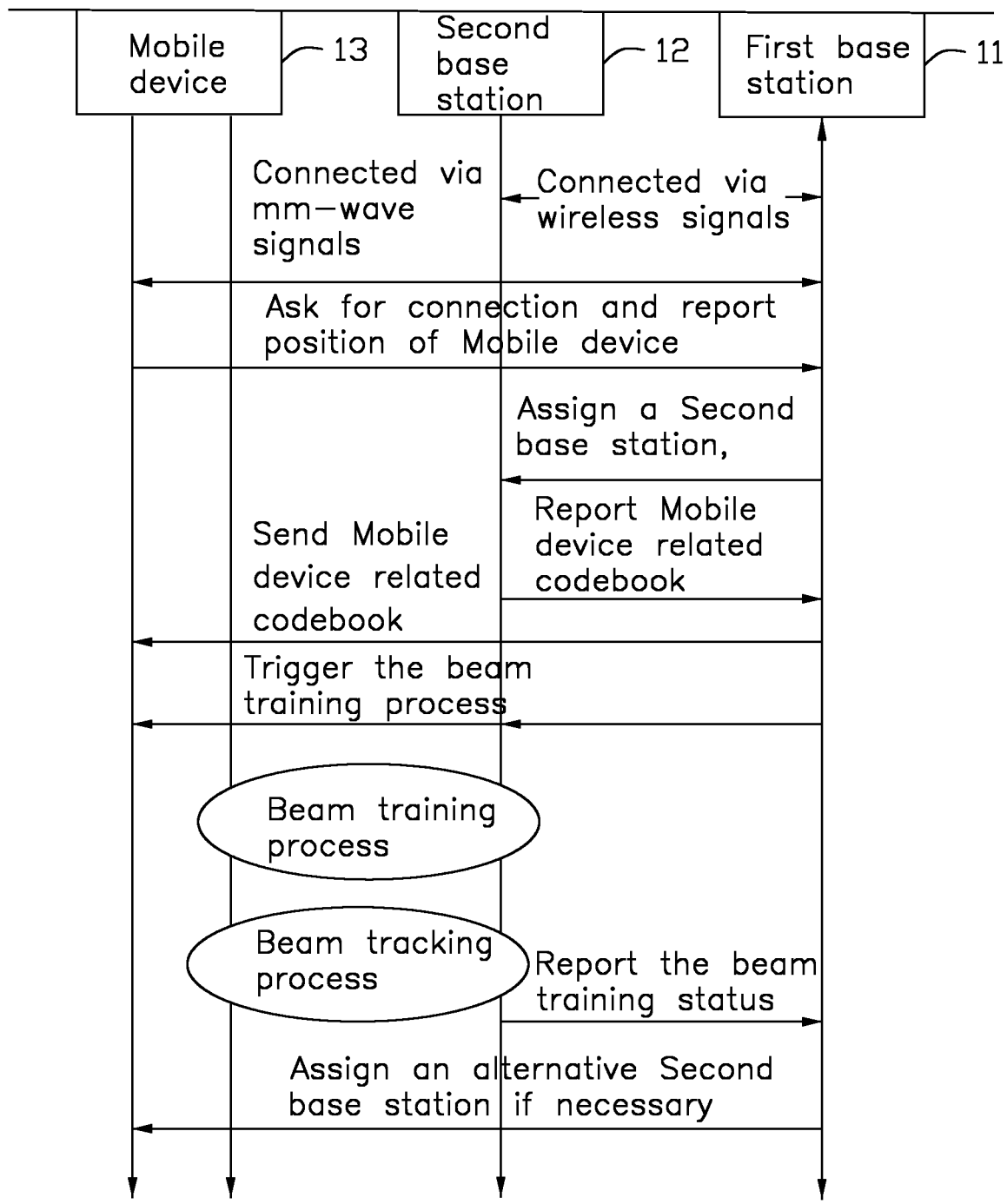
FIG. 5 illustrates an embodiment of a protocol performed in the heterogeneous network.

FIG. 5 illustrates an embodiment of a protocol in the heterogeneous network 1. In at least one embodiment, the first base station 11 can be a macro LTE base station (Macro LTE BS), and transmit and receive wireless signals having a first frequency. The second base station 12 can be an mm-wave base station (mmWave BS), and transmit and receive mm-wave signals having a second frequency. In one embodiment, the first frequency can be a frequency used for an LTE protocol defined in 3GPP while the second frequency can be a frequency used for a 5G protocol defined in 3GPP. The second frequency is higher than the first frequency. The mobile device 13 can be a heterogeneous UE (Hetnet UE) configured to communicate with the second base stations 12 via the mm-wave signals, for example, transmitted or received through a mm-wave transceiver (mmWave) and communicate with the first base station 11 via the wireless signals, for example, transmitted or received through an LTE transceiver (LTE). The mobile device 13 is wirelessly connected to the first base station 11 through a control plane and sends, via the wireless signals, the first base station 11 a position of the mobile device 13 and a request for connecting with one of the second base stations 12, that is, to ask for a mmWave connection and report UE position as shown in FIG. 5. When receiving the position of the mobile device 13 and the request for connecting with one of the second base stations 12, the first base station 11 determines one of the second base stations 12 to connect with the mobile device 13 and sends the second base station 12 a notification so as to assign an appropriate mm-wave base station with UE location. In one embodiment, after receiving the notification, the second base station 12 can send the first base station 11 the first beam angle information (UE related codebook). Further, the first base station 11 sends, via the wireless signals, the mobile device 13 the first beam angle information, which can be received from the second base station 12 and stored in the database server 14 and triggers the mobile device 13 and the determined second base station 12 to perform the beam training process BTP (i.e. beam alignment process shown in FIG. 5) according to the first beam angle information. In at least one embodiment, the first base station 11 can further send, via the wireless signal, the one determined second base station 12 the first beam angle information.

Figure 6:
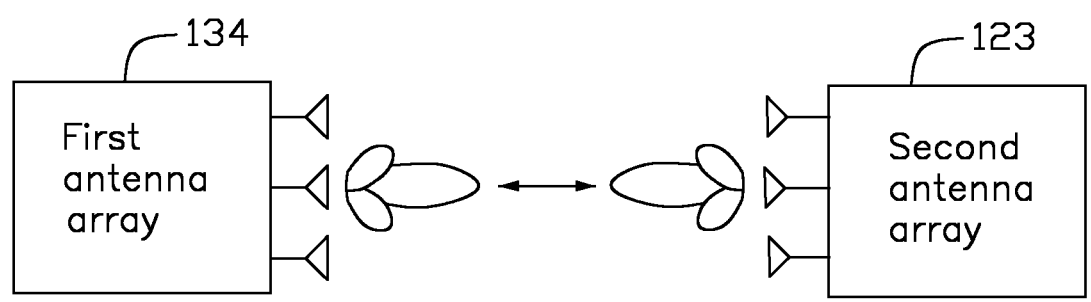
FIG. 6 illustrates one embodiment of a beam training process.
Figure 7:
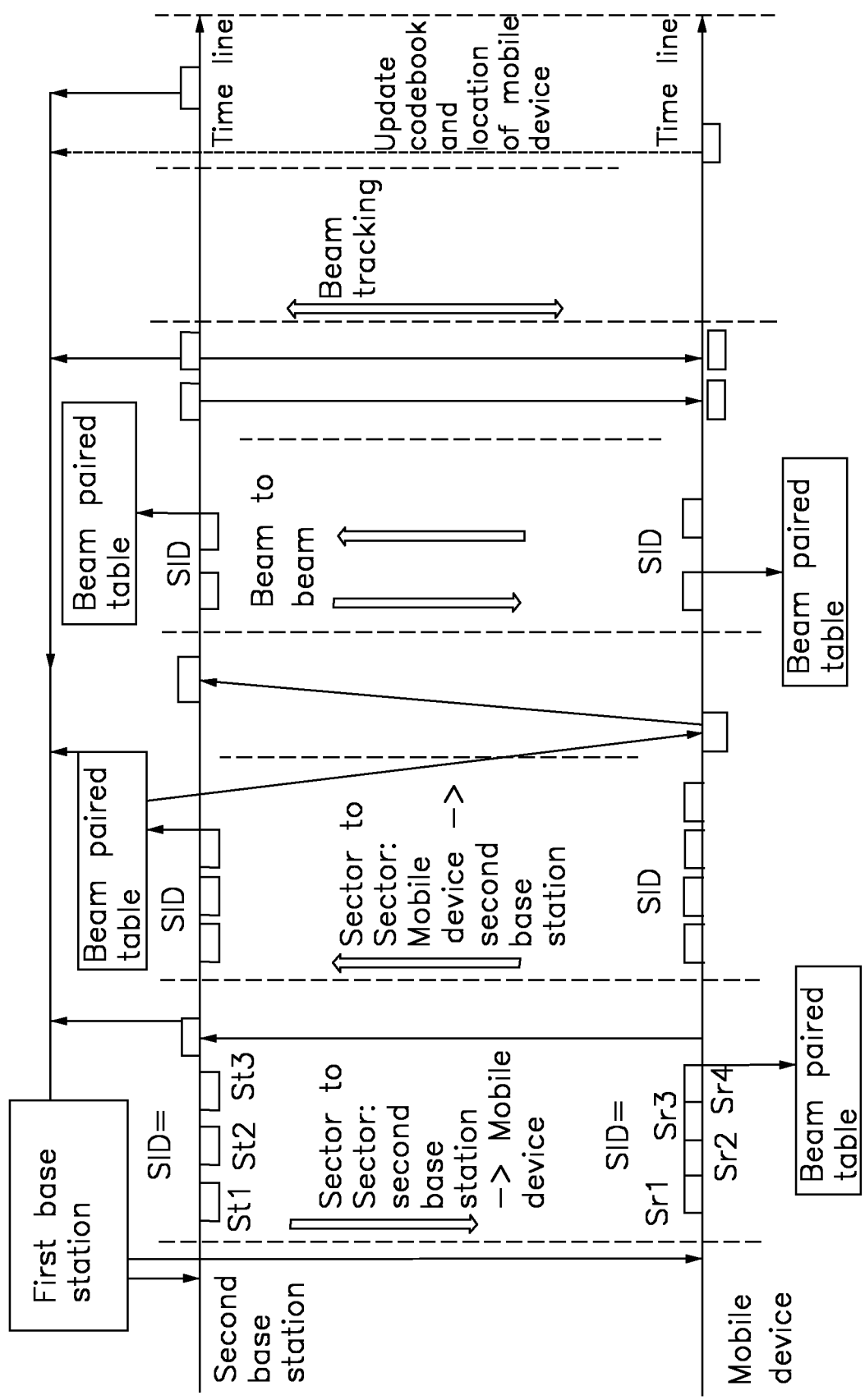
FIG. 7 illustrates an embodiment of communication between a first antenna array and a second antenna array.
Figure 8:
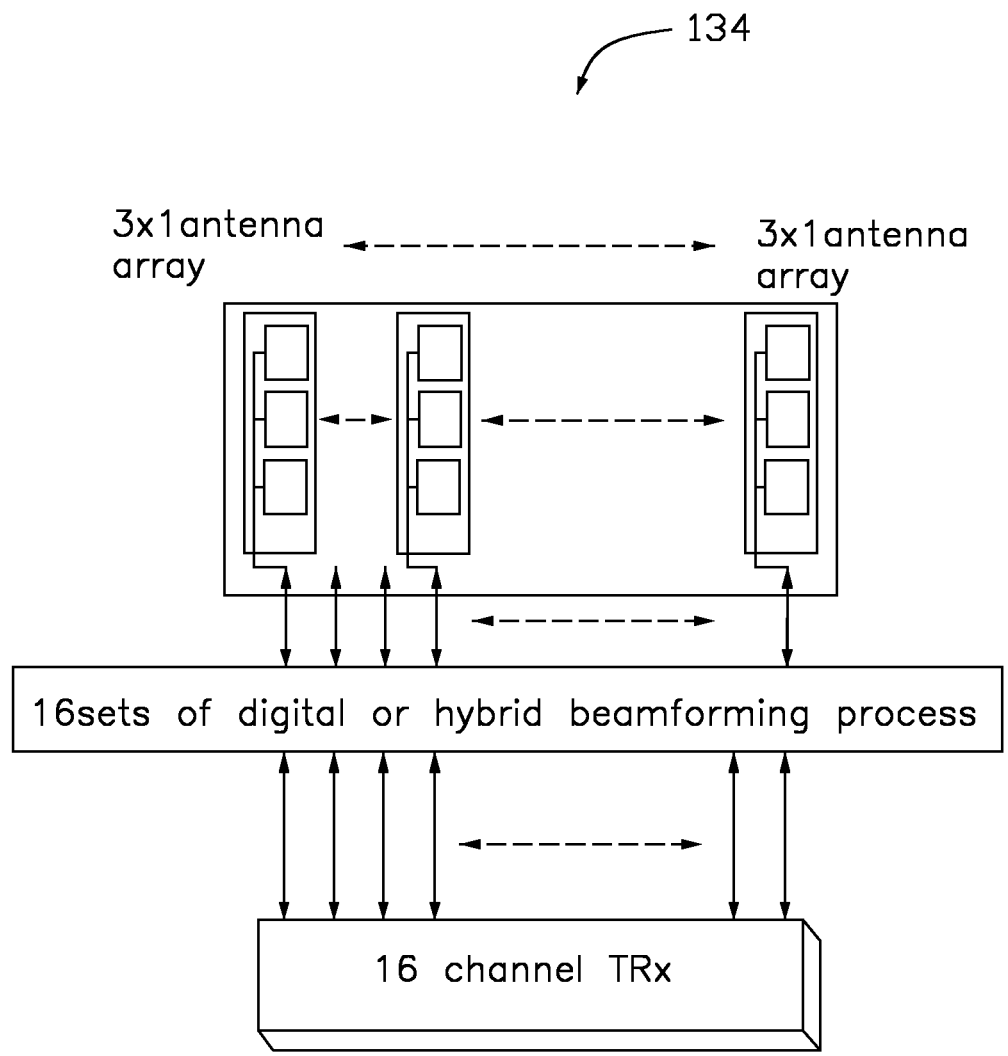
FIG. 8 illustrates an embodiment of an antenna array structure.
Figure 9:
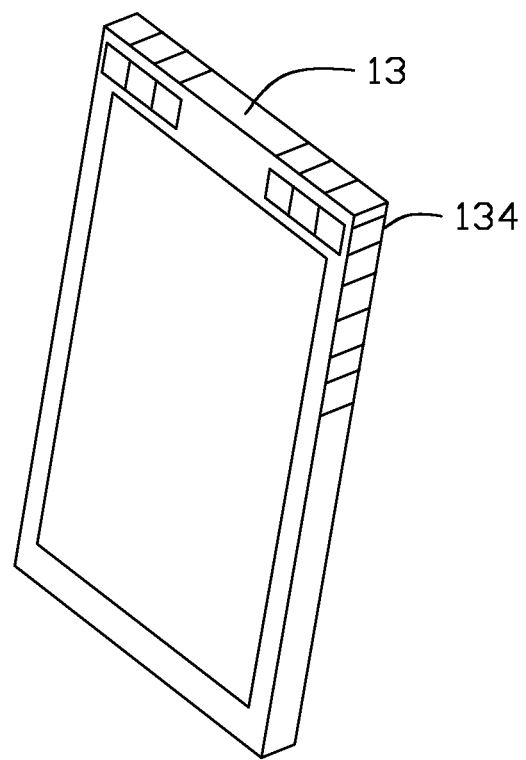
FIG. 9 illustrates an embodiment of the mobile device with the first antenna array.

FIG. 6 illustrates an embodiment of the beam training process. FIG. 7 illustrates an embodiment of a communication between the first antenna array 134 and the second antenna array 123. In at least one embodiment, the at least one first antenna array 134 of the mobile device 13 generates at least one first antenna beam for receiving the mm-wave signals and at least one second antenna beam for transmitting the mm-wave signals. The at least one second antenna array 123 of the one determined second base station 12 generates at least one third antenna beam for receiving the mm-wave signals and at least one fourth antenna beam for transmitting the mm-wave signals. In one embodiment, when the beam training process is performed, the at least one second antenna array 123 of the second base station 12 generates the at least one fourth antenna beam with a first beam width according to the first beam angle information for transmitting the mm-wave signals. The at least one first antenna array 134 of the mobile device 13 generates the at least one first antenna beam with a second beam width according to the first beam angle information for receiving the mm-wave signals from the at least one second antenna array 123. FIG. 8 illustrates an embodiment of an antenna array structure. In one embodiment, the at least one first antenna array 134 or the second antenna array 123 has 3×1 antenna arrays (e.g. sixteen 3×1 antenna arrays) for transmitting or receiving information transmitted through a plurality of channels (e.g. 16 channels) and generates antenna beams according to a plurality sets (e.g. 16 sets) of digital or hybrid beamforming processes. FIG. 9 illustrates an embodiment of the mobile device 13 with the first antenna arrays 134. In this embodiment, the mobile device 13 has its top surface, side surface and front surface mounted with, two first antenna array 123, i.e. two 3×1 antenna arrays.

Figure 10:
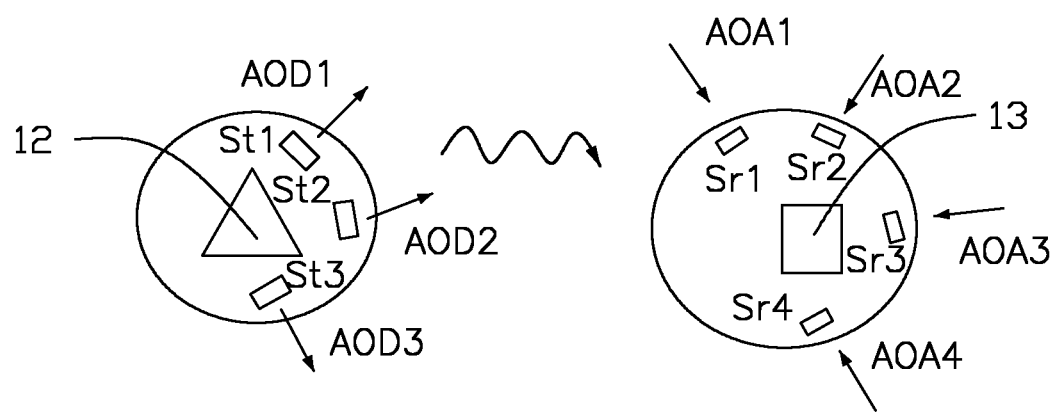
FIG. 10 illustrates an embodiment of a sector scan process between the mobile device and the second base station.

In at least one embodiment, the first beam angle information includes at least one of a first angle of arrival (AOA) and a first angle of departure (AOD) of the mm-wave signals transmitted between the mobile device 13 and the one determined second base station 12. FIG. 10 illustrates a scan process between the mobile device 13 and the second base station 12. In one embodiment, the determined second base station 12 has three sectors St1, St2, St3, and each sector has the at least one second antenna array 123. When the beam training process is performed, the second antenna arrays 123 transmit the mm-wave signals according to the first angle of departures, AOD1, AOD2, AOD3, and process a sector level scan through the three sectors St1, St2, St3. The mobile device 13 has four sectors Sr1, Sr2, Sr3, Sr4 and each sector has the at least one first antenna array 134. When the beam training process is performed, the first antenna arrays 134 receive the mm-wave signals according to the first angle of arrivals AOA1, AOA2, AOA3, AOA4, and process a sector scan through the four sectors Sr1, Sr2, Sr3, Sr4.

In the sector level scan of the determined second base station 12, the at least one second antenna array 123 of the determined second base station 12 generates the at least one fourth antenna beam with the first beam width according to the first angle of departure for transmitting the mm-wave signals. In the sector level scan of the mobile device 13, the at least one first antenna array 134 of the mobile device 13 generates the at least one first antenna beam with the second beam width according to the first angle of arrival for receiving the mm-wave signals from the at least one second antenna array 123.

Figure 11:
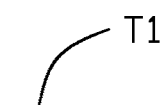
FIG. 11 illustrates an embodiment of a beam paired table.

The mobile device 13 further obtains a second beam angle information according to signal quality of the mm-wave signals received by the at least one first antenna beam with the second beam width. In at least one embodiment, the second beam angle information includes at least one of a second angle of arrival and a second angle of departure of the mm-wave signals transmitted by the at least one fourth antenna beam with the first beam width and received by the at least one first antenna beam with the second beam width. FIG. 11 illustrates an embodiment of a beam paired table T1. In one embodiment, the mobile device 13 further stores a beam paired table T1, the beam paired table T1 define a relationship of a signal quality, an antenna beam of second base station 12, a AOD of the second base station 12, an antenna beam of the mobile device 13, a AOA of the mobile device 13. The mobile device 13 further stores the second beam angle information and the first antenna beam in the beam paired table T1.

After obtaining the second beam angle information, the at least one first antenna array 134 of the mobile device 13 generates the at least one second antenna beam with a third beam width for transmitting the mm-wave signals. The at least one second antenna array 123 of the determined second base station 12 generates the at least one third antenna beam with the fourth beam width for receiving the mm-wave signals from the at least one first antenna array 134. The determined second base station 12 further obtains a third beam angle information according to signal quality of the mm-wave signals received by the at least one third antenna beam with the fourth beam width. In at least one embodiment, the third beam angle information includes at least one of a third angle of arrival and a third angle of departure of the mm-wave signals transmitted by the at least one second antenna beam with the third beam width and received by the at least one third antenna beam with the fourth beam width.

After obtaining the third beam angle information, the at least one second antenna array 123 of the second base station 12 generates the at least one fourth antenna beam with a fifth beam width according to the second beam angle information for transmitting the mm-wave signals. The at least one first antenna array 134 of the mobile device 13 generates the at least one first antenna beam with a sixth beam width according to the second beam angle information for receiving the mm-wave signals from the at least one second antenna array 123. In at least one embodiment, the fifth beam width and the sixth beam width are smaller than the first beam width and the second beam width. The mobile device 13 obtains a fourth beam angle information according to signal quality of the mm-wave signals received by the at least one first antenna beam with the sixth beam width. In at least one embodiment, the fourth beam angle information includes at least one of a fourth angle of arrival and a fourth angle of departure of the mm-wave signals transmitted by the at least one fourth antenna beam with the fifth beam width and received by the at least one first antenna beam with the sixth beam width.

In at least one embodiment, the at least one first antenna array 134 further generates the at least one second antenna beam with a seventh beam width according to the third beam angle information for transmitting the mm-wave signals. The at least one second antenna array 123 generates the at least one third antenna beam with a eighth beam width according to the third beam angle information for receiving the mm-wave signals from the at least one first antenna array 134. In at least one embodiment, the determined second base station 12 obtains a fifth beam angle information according to signal quality of the mm-wave signals received by the at least one third antenna beam with the eighth beam width. In at least one embodiment, the fifth beam angle information includes at least one of a fifth angle of arrival and a fifth angle of departure of the mm-wave signals transmitted by the at least one second antenna beam with the seven beam width and received by the at least one third antenna beam with the eighth beam width. In at least one embodiment, the seventh beam width and the eighth beam width are smaller than the third beam width and the fourth beam width. Thus, the heterogeneous network 1 accomplishes beam training between the determined base station 12 and the mobile device 13 on up-link and down-link connections.

After accomplishing beam training, the mobile device 13 further receives the mm-wave signals according to the fourth angle of arrival of the fourth beam angle information, and detects a movement of the mobile device 13 by the moving sensor 133. When the moving sensor 133 detects the movement of the mobile device 13, the mobile device 13 determines a sixth beam angle information according to the signal quality of the mm-wave signal received by the at least one first antenna beam 134. In at least one embodiment, the sixth beam angle information includes a sixth angle of arrival and a sixth angle of departure of the mm-wave signals received by the at least one first antenna beam 134. The mobile device 13 receives the mm-wave signals according to the sixth angle of arrival of the mm-wave signals transmitted by the at least one second antenna array 123 of the second base station 12.

The mobile device 13 send, via the wireless signals, the first base station 11 the sixth angle of arrival when detecting the movement of the mobile device 13. The first base station 11 receives the sixth angle of arrival and updates the first beam angle information with the sixth angle of arrival added.

In at least one embodiment, the at least one first antenna array 134 includes at least two first antenna arrays. The mobile device 13 utilizes one of the first antenna arrays to receive the mm-wave signals according to the fourth angle of arrival and utilizes another one of the first antenna arrays to receive the mm-wave signals according to the sixth angle of arrival.

Figure 12:
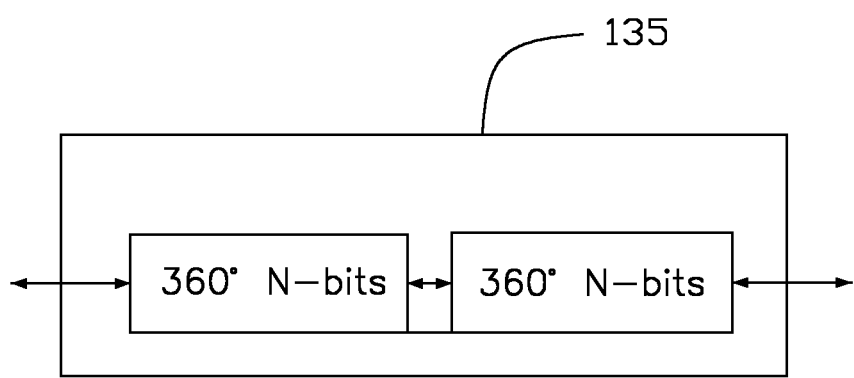
FIG. 12 illustrates an embodiment of a first phase shifter.

In at least one embodiment, the first beam angle information further includes at least one first antenna weighting vector for the at least one first antenna array 134 to generate the at least one first antenna beam and the at least one second antenna beam. In at least one embodiment, the at least one first antenna weighting vector includes a number of first setting bits to control the at least one first phase shifter 135 to make the at least one first antenna array 134 generate the at least one first antenna beam and the at least one second antenna beam according to the first setting bits. FIG. 12 illustrates the first phase shifter 135.

The first beam angle information further includes at least one second antenna weighting vector for the at least one second antenna array 123 to generate the at least one third antenna beam and the at least one fourth antenna beam. In at least one embodiment, the at least one second antenna weighting vector includes a number of second setting bits to control the at least one second phase shifter 124 so that the at least one second antenna array generates the at least one third antenna beam and the at least one fourth antenna beam according to the second setting bits.

Figure 13:
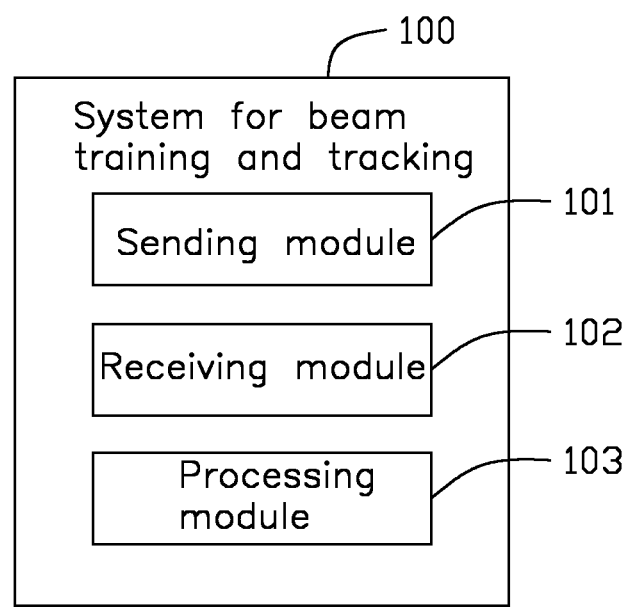
FIG. 13 illustrates an embodiment of a system for beam training and tracking.

FIG. 13 illustrates an embodiment of a system 100 for beam training and tracking. The system 100 runs in the mobile device 13. In at least one embodiment, the system 1 includes a sending module 101, a receiving module 102, and a processing module 103. The modules 101-103 of the system 100 can be collections of software instructions stored in the first storage device 131 and executed by the first processor 132 of the mobile device 13.

The sending module 101 is configured to send, via wireless signals, the first base station 11 a position of the mobile device 13 and a request for connecting with one of the second base stations 12. In at least one embodiment, the first base station 11 determines one of the second base stations 12 to connect with the mobile device 13 and obtains a first beam angle information according to the position and the request sent by the mobile device 13.

The receiving module 102 is configured to receive the first beam angle information from the first base station 11.

The processing module 103 is configured to perform a beam training process with the determined second base station 12 according to the first beam angle information. In at least one embodiment, the first beam angle information includes at least one of a first angle of arrival and a first angle of departure of the mm-wave signals transmitted between the mobile device 13 and the one determined second base station 12.

In at least one embodiment, the processing module 103 is further configured to control the at least one first antenna array 134 to generate at least one first antenna beam with a first beam width according to the first beam angle information for receiving the mm-wave signals from the at least one second antenna array 123. In at least one embodiment, the at least one second antenna array 123 generates at least one second antenna beam with a second beam width according to the first beam angle information for transmitting the mm-wave signals to the mobile device 13.

In at least one embodiment, the processing module 103 is further configured to obtain a second beam angle information according to signal quality of the mm-wave signals received by the at least one first antenna beam with the first beam width. In at least one embodiment, the second beam angle information includes at least one of a second angle of arrival and a second angle of departure of the mm-wave signals transmitted by the at least one second antenna beam with the second beam width and received by the at least one first antenna beam with the first beam width.

In at least one embodiment, the processing module 103 is further configured to control the at least one first antenna array 134 to generate the at least one first antenna beam with a third beam width according to the second beam angle information for receiving the mm-wave signals from the at least one second antenna array 123. The at least one second antenna array 123 of the second base station 12 generates the at least one second antenna beam with a fourth beam width according to the second beam angle information for transmitting the mm-wave signals to the mobile device 13. In at least one embodiment, the third beam width and the fourth beam width are smaller than the first beam width and the second beam width.

In at least one embodiment, the processing module 103 is further configured to obtain a third beam angle information according to signal quality of the mm-wave signal received by the at least one first antenna beam with the third beam width. In at least one embodiment, the third beam angle information includes at least one of a third angle of arrival and a third angle of departure of the mm-wave signals transmitted by the at least one second antenna beam with the fourth beam width and received by the at least one first antenna beam with the third beam width. The processing module 103 further receives the mm-wave signals according to the third angle of arrival. The processing module 103 acquires the moving information from the at least one moving sensor 133, and determines whether the mobile device 13 moves. When determining the movement of the mobile device 13, the processing module receives the mm-wave signals according to a fourth angle of arrival of the mm-wave signals transmitted by the at least one second antenna array 123. In at least one embodiment, the processing module 103 sends, via the wireless signals, the first base station the fourth angle of arrival and a second position of the mobile device after the movement to update the first beam angle information with the fourth angle of arrival added.

In at least one embodiment, the first beam angle information includes at least one first antenna weighting vector. The processing module 103 controls the at least one first antenna array to generate the at least one first antenna beam according to the at least one first antenna weighting vector. In at least one embodiment, the at least one first antenna weighting vector includes a plurality of first setting bits to control the at least one first phase shifter 135. The processing module 103 controls the at least one first antenna array 134 to generate the at least one first antenna beam according to the first setting bits of the first antenna weighting vector.

Figure 14:
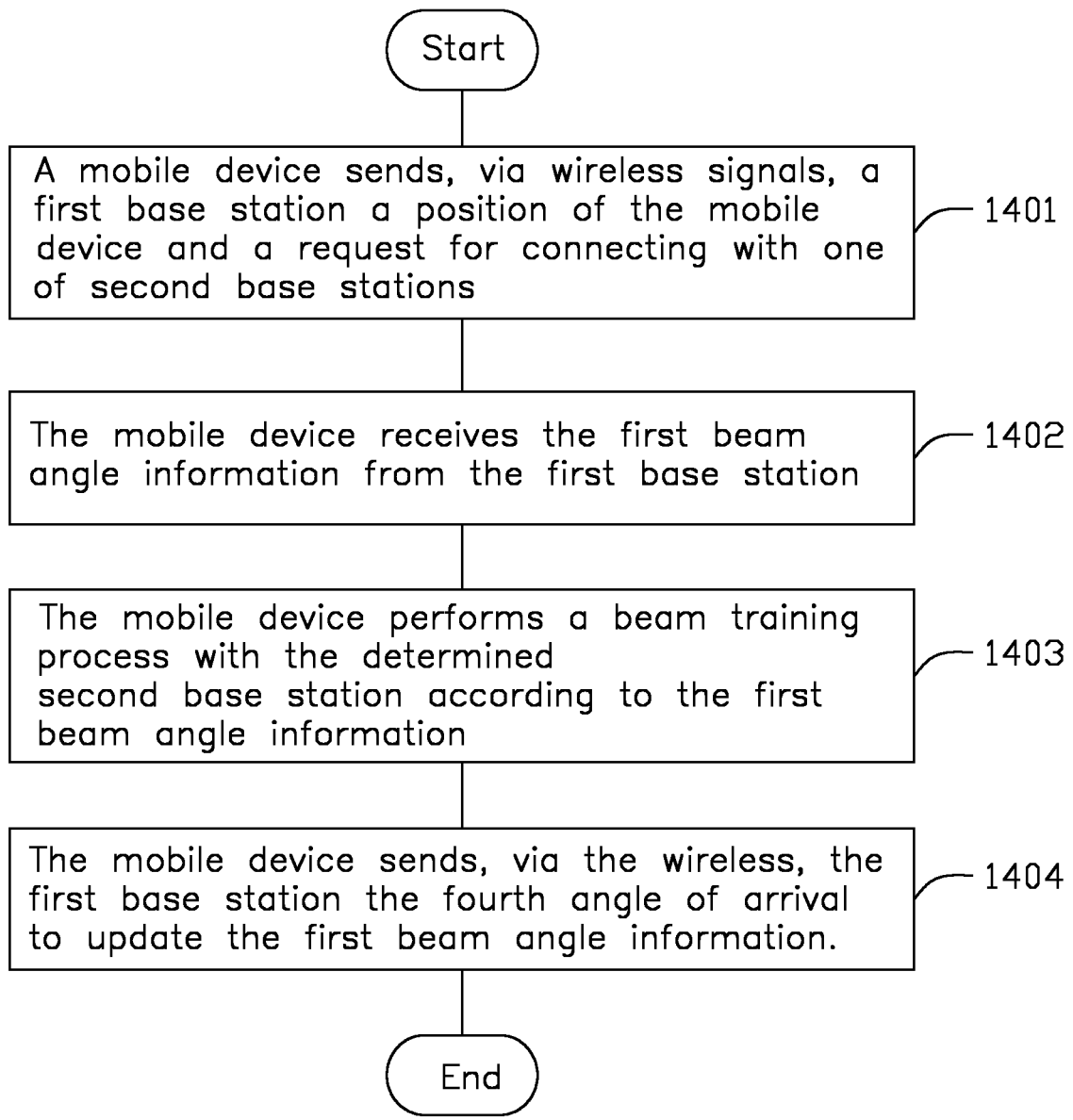
FIG. 14 illustrates a flowchart of one embodiment of a method for beam training and tracking.

FIG. 14 illustrates a flowchart of one embodiment of a method for beam training and tracking. The method is implemented by a mobile device having at least one first antenna array configured to communicate with second base stations via mm-wave signals. The method is provided by way of example, as there are a variety of ways to carry out the method. The method described below can be carried out using the configurations illustrated in FIGS. 1-13, for example, and various elements of these figures are referenced in explaining the example method. Each block shown in FIG. 14 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 1401.

At block 1401, a mobile device sends, via wireless signals, a first base station a position of the mobile device and a request for connecting with one of second base stations. In at least one embodiment, the first base station determines one of the second base stations to connect with the mobile device and obtains a first beam angle information according to the position and the request sent by the mobile device.

At block 1402, the mobile device receives the first beam angle information from the first base station.

At block 1403, the mobile device performs a beam training process with the determined second base station according to the first beam angle information. In at least one embodiment, the first beam angle information includes at least one of a first angle of arrival and a first angle of departure of the mm-wave signals transmitted between the mobile device and the one determined second base station.

In at least one embodiment, the one determined second base station has at least one second antenna array. When the beam training process is performed, the mobile device and the one determined second base station perform the following steps described below. The mobile device controls the at least one first antenna array to generate at least one first antenna beam with a first beam width according to the first beam angle information for receiving the mm-wave signals from the at least one second antenna array. The at least one second antenna array generates at least one second antenna beam with a second beam width according to the first beam angle information for transmitting the mm-wave signals to the mobile device. In at least one embodiment, the mobile device further obtains a second beam angle information according to signal quality of the mm-wave signals received by the at least one first antenna beam with the first beam width. The second beam angle information includes at least one of a second angle of arrival and a second angle of departure of the mm-wave signals transmitted by the at least one second antenna beam with the second beam width and received by the at least one first antenna beam with the first beam width.

Afterwards, the mobile device further controls the at least one first antenna array to generate the at least one first antenna beam with a third beam width according to the second beam angle information for receiving the mm-wave signals from the at least one second antenna array. Then, the at least one second antenna array generates the at least one second antenna beam with a fourth beam width according to the second beam angle information for transmitting the mm-wave signals to the mobile device. In at least one embodiment, the third beam width and the fourth beam width are smaller than the first beam width and the second beam width.

In at least one embodiment, the mobile device further includes at least one moving sensor configured to detect a movement of the mobile device. The mobile device further obtains a third beam angle information according to signal quality of the mm-wave signal received by the at least one first antenna beam with the third beam width. In at least one embodiment, the third beam angle information includes at least one of a third angle of arrival and a third angle of departure of the mm-wave signals transmitted by the at least one second antenna beam with the fourth beam width and received by the at least one first antenna beam with the third beam width. The mobile device further receives the mm-wave signals according to the third angle of arrival.

In at least one embodiment, the mobile device further receives the mm-wave signals according to the third angle of arrival. The mobile device acquires the moving information from the at least one moving sensor, and determines whether the mobile device moves. When determining the movement of the mobile device, the mobile device receives the mm-wave signals according to a fourth angle of arrival of the mm-wave signals transmitted by the at least one second antenna array.

At block 1404, the mobile device sends, via the wireless, the first base station the fourth angle of arrival to update the first beam angle information. In one embodiment, the mobile device sends, via the wireless, the first base station the fourth angle of arrival and a second position of the mobile device after the movement, and the first beam angle information is updated with the fourth angle of arrival added.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A heterogeneous network comprising:
    a first base station configured to transmit and receive wireless signals having a first frequency;
    a plurality of second base stations each configured to transmit and receive mm-wave signals having a second frequency higher than the first frequency; and
    a mobile device configured to communicate with the second base stations via the mm-wave signals and send, via the wireless signals, the first base station a position of the mobile device and a request for connecting with one of the second base stations;
    wherein the first base station is configured to determine one of the second base stations to connect with the mobile device and obtain a first beam angle information according to the position and the request sent by the mobile device;
    wherein the first base station is further configured to send, via the wireless signals, the mobile device the first beam angle information and trigger the mobile device and the one determined second base station to perform a beam training process according to the first beam angle information, and wherein the first beam angle information comprises at least one of a first angle of arrival and a first angle of departure of the mm-wave signals transmitted between the mobile device and the one determined second base station.

2. The heterogeneous network according to claim 1, wherein the first base station is further configured to send, via the wireless signals, the one determined second base station the first beam angle information.

3. The heterogeneous network according to claim 1, wherein the mobile device comprises at least one first antenna array configured to generate at least one first antenna beam for receiving the mm-wave signals and at least one second antenna beam for transmitting the mm-wave signals, and the one determined second base station comprises at least one second antenna array configured to generate at least one third antenna beam for receiving the mm-wave signals and at least one fourth antenna beam for transmitting the mm-wave signals.

4. The heterogeneous network according to claim 3, wherein when the beam training process is performed, the at least one second antenna array generates the at least one fourth antenna beam with a first beam width according to the first beam angle information for transmitting the mm-wave signals while the at least one first antenna array generates the at least one first antenna beam with a second beam width according to the first beam angle information for receiving the mm-wave signals from the at least one second antenna array.

5. The heterogeneous network according to claim 4, wherein the mobile device obtains a second beam angle information according to signal quality of the mm-wave signals received by the at least one first antenna beam with the second beam width, and wherein the second beam angle information comprises at least one of a second angle of arrival and a second angle of departure of the mm-wave signals transmitted by the at least one fourth antenna beam with the first beam width and received by the at least one first antenna beam with the second beam width.

6. The heterogeneous network according to claim 5, wherein when the beam training process is performed, the at least one first antenna array generates the at least one second antenna beam with a third beam width for transmitting the mm-wave signals while the at least one second antenna array generates the at least one third antenna beam with a fourth beam width for receiving the mm-wave signals from the at least one first antenna array.

7. The heterogeneous network according to claim 6, wherein the one determined second base station obtains a third beam angle information according to signal quality of the mm-wave signals received by the at least one third antenna beam with the fourth beam width, and wherein the third beam angle information comprises at least one of a third angle of arrival and a third angle of departure of the mm-wave signals transmitted by the at least one second antenna beam with the third beam width and received by the at least one third antenna beam with the fourth beam width.

8. The heterogeneous network according to claim 5, wherein the at least one second antenna array generates the at least one fourth antenna beam with a fifth beam width according to the second beam angle information for transmitting the mm-wave signals while the at least one first antenna array generates the at least one first antenna beam with a sixth beam width according to the second beam angle information for receiving the mm-wave signals from the at least one second antenna array; and wherein the fifth beam width and the sixth beam width are smaller than the first beam width and the second beam width.

9. The heterogeneous network according to claim 8, wherein the mobile device obtains a fourth beam angle information according to signal quality of the mm-wave signals received by the at least one first antenna beam with the sixth beam width, and wherein the fourth beam angle information comprises at least one of a fourth angle of arrival and a fourth angle of departure of the mm-wave signals transmitted by the at least one fourth antenna beam with the fifth beam width and received by the at least one first antenna beam with the sixth beam width.

10. The heterogeneous network according to claim 7, wherein the at least one first antenna array generates the at least one second antenna beam with a seventh beam width according to the third beam angle information for transmitting the mm-wave signals while the at least one second antenna array generates the at least one third antenna beam with a eighth beam width according to the third beam angle information for receiving the mm-wave signals from the at least one first antenna array.

11. The heterogeneous network according to claim 10, wherein the one determined second base station obtains a fifth beam angle information according to signal quality of the mm-wave signals received by the at least one third antenna beam with the eighth beam width, and wherein the fifth beam angle information comprises at least one of a fifth angle of arrival and a fifth angle of departure of the mm-wave signals transmitted by the at least one second antenna beam with the seven beam width and received by the at least one third antenna beam with the eighth beam width; and wherein the seventh beam width and the eighth beam width are smaller than the third beam width and the fourth beam width.

12. The heterogeneous network according to claim 9, wherein the mobile device is further configured to receive the mm-wave signals according to the fourth angle of arrival and comprises at least one moving sensor configured to detect a movement of the mobile device; and wherein when the at least one moving sensor detects the movement, the mobile device receives the mm-wave signals according to a sixth angle of arrival of the mm-wave signals transmitted by the at least one second antenna array.

13. The heterogeneous network according to claim 12, wherein the mobile device is further configured to send, via the wireless signals, the first base station the sixth angle of arrival and a second position of the mobile device after the movement, and the first beam angle information is updated with the sixth angle of arrival added.

14. The heterogeneous network according to claim 12, wherein the at least one first antenna array comprises at least two first antenna arrays, and the mobile device utilizes one of the first antenna arrays to receive the mm-wave signals according to the fourth angle of arrival and utilizes another one of the first antenna arrays to receive the mm-wave signals according to the sixth angle of arrival.

15. The heterogeneous network according to claim 3, wherein the first beam angle information further comprises at least one first antenna weighting vector for the at least one first antenna array to generate the at least one first antenna beam and the at least one second antenna beam and comprises at least one second antenna weighting vector for the at least one second antenna array to generate the at least one third antenna beam and the at least one fourth antenna beam.

16. The heterogeneous network according to claim 15, wherein the mobile device further comprises at least one first phase shifter electrically coupled to the at least one first antenna array; and wherein the at least one first antenna weighting vector comprises a plurality of first setting bits to control the at least one first phase shifter so that the at least one first antenna array generates the at least one first antenna beam and the at least one second antenna beam according to the first setting bits.

17. The heterogeneous network according to claim 16, wherein the one determined second base station further comprises at least one second phase shifter electrically coupled to the at least one second antenna array; and wherein the at least one second antenna weighting vector comprises a plurality of second setting bits to control the at least one second phase shifter so that the at least one second antenna array generates the at least one third antenna beam and the at least one fourth antenna beam according to the second setting bits.

18. The heterogeneous network according to claim 1, wherein the first base station is an LTE base station and each of the second base stations is an mm-wave base station.

19. The heterogeneous network according to claim 1, further comprising:
    a database server connected to the first base station and configured to store the first beam angle information, wherein the first base station is configured to obtain the first beam angle information from the database server and send the obtained first beam angle information to the mobile device.

20. A mobile device for beam training and tracking comprising:
    at least one first antenna array configured to communicate with second base stations via mm-wave signals;
    a first processor coupled with the first antenna array; and
    a non-transitory storage medium coupled to the first processor and configured to store a plurality of instructions, which cause the first processor to:
    send, via wireless signals, a first base station a position of the mobile device and a request for connecting with one of the second base stations, wherein the first base station determines one of the second base stations to connect with the mobile device and obtains a first beam angle information according to the position and the request sent by the mobile device;
    receive the first beam angle information from the first base station; and
    perform a beam training process with the one determined second base station according to the first beam angle information, wherein the first beam angle information comprises at least one of a first angle of arrival and a first angle of departure of the mm-wave signals transmitted between the mobile device and the one determined second base station.

21. The mobile device according to claim 20, wherein the one determined second base station comprises at least one second antenna array and the plurality of instructions further cause the first processor to:
    control the at least one first antenna array to generate at least one first antenna beam with a first beam width according to the first beam angle information for receiving the mm-wave signals from the at least one second antenna array, wherein the at least one second antenna array generates at least one second antenna beam with a second beam width according to the first beam angle information for transmitting the mm-wave signals to the mobile device; and
    obtain a second beam angle information according to signal quality of the mm-wave signals received by the at least one first antenna beam with the first beam width, wherein the second beam angle information comprises at least one of a second angle of arrival and a second angle of departure of the mm-wave signals transmitted by the at least one second antenna beam with the second beam width and received by the at least one first antenna beam with the first beam width.

22. The mobile device according to claim 21, wherein the plurality of instructions further cause the first processor to:
    control the at least one first antenna array to generate the at least one first antenna beam with a third beam width according to the second beam angle information for receiving the mm-wave signals from the at least one second antenna array, wherein the at least one second antenna array generates the at least one second antenna beam with a fourth beam width according to the second beam angle information for transmitting the mm-wave signals to the mobile device; and wherein the third beam width and the fourth beam width are smaller than the first beam width and the second beam width.

23. The mobile device according to claim 22, further comprising at least one moving sensor configured to detect a movement of the mobile device, wherein the plurality of instructions further cause the first processor to:
    obtain a third beam angle information according to signal quality of the mm-wave signal received by the at least one first antenna beam with the third beam width, wherein the third beam angle information comprises at least one of a third angle of arrival and a third angle of departure of the mm-wave signals transmitted by the at least one second antenna beam with the fourth beam width and received by the at least one first antenna beam with the third beam width;
    receive the mm-wave signals according to the third angle of arrival;
    receive the mm-wave signals according to a fourth angle of arrival of the mm-wave signals transmitted by the at least one second antenna array when the at least one moving sensor detects the movement; and
    send, via the wireless signals, the first base station the fourth angle of arrival and a second position of the mobile device after the movement, wherein the first beam angle information is updated with the fourth angle of arrival added.

24. The mobile device according to claim 21, wherein the first beam angle information further comprises at least one first antenna weighting vector for the at least one first antenna array to generate the at least one first antenna beam.

25. The mobile device according to claim 24, wherein the mobile device further comprises at least one first phase shifter electrically coupled to the at least one first antenna array, the at least one first antenna weighting vector comprises a plurality of first setting bits to control the at least one first phase shifter, and the at least one first antenna array generates the at least one first antenna beam according to the first setting bits.

26. A method for beam training and tracking, implemented by a mobile device having at least one first antenna array configured to communicate with second base stations via mm-wave signals, the method comprising:
    sending, via wireless signals, a first base station a position of the mobile device and a request for connecting with one of the second base stations, wherein the first base station determines one of the second base stations to connect with the mobile device and obtains a first beam angle information according to the position and the request sent by the mobile device;
    receiving the first beam angle information from the first base station; and
    performing a beam training process with the one determined second base station according to the first beam angle information, wherein the first beam angle information comprises at least one of a first angle of arrival and a first angle of departure of the mm-wave signals transmitted between the mobile device and the one determined second base station.

27. The method according to claim 26, wherein the one determined second base station has at least one second antenna array and the method further comprises:
- controlling the at least one first antenna array to generate at least one first antenna beam with a first beam width according to the first beam angle information for receiving the mm-wave signals from the at least one second antenna array, wherein the at least one second antenna array generates at least one second antenna beam with a second beam width according to the first beam angle information for transmitting the mm-wave signals to the mobile device; and
- obtaining a second beam angle information according to signal quality of the mm-wave signals received by the at least one first antenna beam with the first beam width, wherein the second beam angle information comprises at least one of a second angle of arrival and a second angle of departure of the mm-wave signals transmitted by the at least one second antenna beam with the second beam width and received by the at least one first antenna beam with the first beam width.

28. The method according to claim 27, further comprising:
- controlling the at least one first antenna array to generate the at least one first antenna beam with a third beam width according to the second beam angle information for receiving the mm-wave signals from the at least one second antenna array, wherein the at least one second antenna array generates the at least one second antenna beam with a fourth beam width according to the second beam angle information for transmitting the mm-wave signals to the mobile device; and wherein the third beam width and the fourth beam width are smaller than the first beam width and the second beam width.

29. The method according to claim 28, wherein the mobile device further comprises at least one moving sensor configured to detect a movement of the mobile device and the method further comprises:
- obtaining a third beam angle information according to signal quality of the mm-wave signal received by the at least one first antenna beam with the third beam width, wherein the third beam angle information comprises at least one of a third angle of arrival and a third angle of departure of the mm-wave signals transmitted by the at least one second antenna beam with the fourth beam width and received by the at least one first antenna beam with the third beam width;
- receiving the mm-wave signals according to the third angle of arrival;
- receiving the mm-wave signals according to a fourth angle of arrival of the mm-wave signals transmitted by the at least one second antenna array when the at least one moving sensor detects the movement; and
- sending, via the wireless signals, the first base station the fourth angle of arrival and a second position of the mobile device after the movement, wherein the first beam angle information is updated with the fourth angle of arrival added.

* * * * *